United States Patent [19]
Fishkin et al.

[11] Patent Number: 5,265,186
[45] Date of Patent: Nov. 23, 1993

[54] OPTICAL FIBER DISTRIBUTION APPARATUS

[75] Inventors: Stacy G. Fishkin, Oakland; Robert M. Honeycutt, Morristown; Amal C. Mitra, Bridgewater, all of N.J.

[73] Assignee: AT&T Bell Laboratries, Murray Hill, N.J.

[21] Appl. No.: 790,879

[22] Filed: Nov. 12, 1991

[51] Int. Cl.$^5$ .................................................. G02B 6/36
[52] U.S. Cl. ........................................ 385/135; 385/53
[58] Field of Search ................. 385/134, 135, 136, 53, 385/46, 88, 89

[56] References Cited

U.S. PATENT DOCUMENTS

| | | | |
|---|---|---|---|
| 4,595,255 | 6/1986 | Bhatt et al. ........................ | 385/135 |
| 4,630,886 | 12/1986 | Lauriello et al. ................... | 385/135 |
| 4,634,214 | 1/1987 | Cannon, Jr. et al. ............... | 385/86 |
| 4,861,134 | 8/1989 | Alameel et al. .................... | 385/135 |
| 4,863,232 | 9/1989 | Kwa .................................. | 385/88 |
| 4,881,792 | 11/1989 | Alameel et al. .................... | 385/56 |
| 4,943,136 | 7/1990 | Popoff ............................... | 385/46 |
| 5,067,784 | 11/1991 | Debortoli et al. ................. | 385/135 X |

Primary Examiner—John D. Lee
Assistant Examiner—Phan T. Heartney
Attorney, Agent, or Firm—Lester H. Birnbaum

[57] ABSTRACT

Disclosed is an optical fiber distribution apparatus where the fibers are organized in a horizontal position above or below vertically mounted circuit packs and recessed from the circuit pack faceplates. A fiber termination on a top or bottom edge of each circuit pack mates with connectors to the fibers in the horizontal position.

7 Claims, 2 Drawing Sheets

OPTICAL FIBER DISTRIBUTION APPARATUS

BACKGROUND OF THE INVENTION

This invention relates to optical fiber distribution apparatus.

As the volume of data transmission and processing increases, interconnection systems will include more optical as well as electrical connections between circuit packs. A circuit pack typically includes a printed circuit board with semiconductor electrical and optical components mounted thereon, and electrical and optical connectors on one edge of the board. Typically, the circuit packs are inserted vertically in shelves so that electrical and optical connection is made to a backplane at the far end of the shelf. Since the optical connectors are at the back of the shelf, cleaning and servicing of the fibers and connectors are difficult. Alternatively, the fiber connectors can be provided at the circuit pack faceplates, but this requires the fibers to be positioned in front of the faceplates, which is both aesthetically and functionally disadvantageous.

SUMMARY OF THE INVENTION

The invention is a fiber distribution apparatus comprising a near end and a far end. A backplane is located at the far end of the apparatus, and a plurality of guideways is provided at least at the near end of the apparatus to permit insertion of circuit packs in the shelf so that the circuit packs extend from the near end to the far end. A panel including a plurality of optical connectors is mounted at a position between the near end and far end so as to provide optical connection to circuit packs inserted into the guideways.

BRIEF DESCRIPTION OF THE DRAWING

These and other features of the invention are delineated in detail in the following description. In the drawings.

It will be appreciated that, for purposes of illustration, these figures are not necessarily drawn to scale.

DETAILED DESCRIPTION

Figure 1:
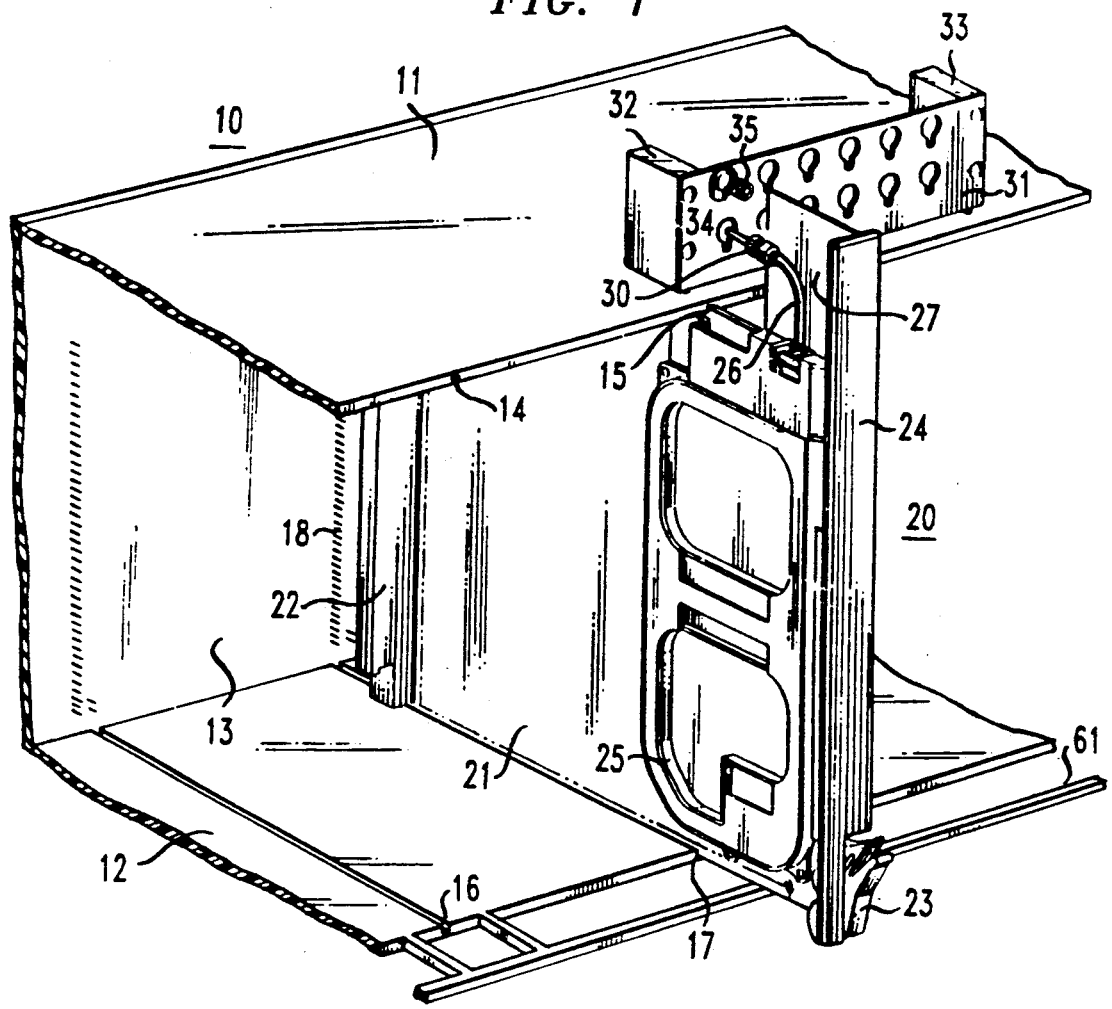
FIG. 1 is a perspective view of a portion of a fiber distribution apparatus in accordance with an embodiment of the invention.

FIG. 1 illustrates some of the basic features of the invention.

The fiber distribution apparatus 10, includes a top and bottom shelf, 11 and 12, respectively, and a backplane, 13, at the far end of the apparatus. The top and bottom shelves include a plurality of guideways, in this example in the form of grooves such as 14–17, which are adapted to receive a plurality of circuit packs, only one of which is illustrated as 20 in FIG. 1. Each circuit pack comprises a printed circuit board, 21, with electrical and optical components thereon (not shown) and an electrical connector, 22, on the far edge of the circuit board. The circuit packs are positioned in the guideways so that each electrical connector engages an associated array of pins, e.g. 18, in the backplane. Thus, electrical interconnection is provided through the backplane either by conductors printed on the backplane or by wires wrapped around the pins on the surface of the backplane opposite the circuit packs.

The circuit pack is secured to the bottom shelf by a standard latch, 23, pivotably mounted to a bottom portion of the circuit board, 21. The latch mechanically engages a railing, 61, which extends from the near end of the bottom shelf 12. A faceplate, 24, including circuit pack identifying information, is provided on the near end of the circuit board, 21.

Also mounted on a portion of the circuit board in close proximity to the near end is a fiber organizer, 25. As known in the art, the organizer generally is a plastic housing which includes a light emitting device and/or a light detecting device (not shown), and tracks for routing optical fiber. The organizer can also include an optical splitter (see, e.g., U.S. Pat. No. 4,861,134 issued to Alameel et al.). The organizer is mounted in a position so that the fiber, 26, which is to be interconnected exits at the top of the organizer. The fiber, 26, includes an optical termination, 30, which will be described in more detail below. It will be noted that the organizer includes a tab portion, 27, which extends above the top edge of the circuit board at the near end in order to provide a means of mounting the termination, 30. The tab portion, 27, which can be an integral part of organizer 25 or a separate piece part, is an L-shaped member with its base snapped into the circuit board and its upper portion screwed into the faceplate.

Mounted on top of the top shelf, 11, is a series of panels, one of which is illustrated as 31. (Additional panels can be seen in the top view of FIG. 2.) Each panel is mounted by means of brackets 32 and 33 which, in turn, are fastened to the top shelf. The panels are positioned in a plane which is recessed from the near end of the top shelf and from the circuit pack faceplates, 24. The amount of recess from the shelf would be, typically, in the range 0.5–1.5 cm, and the amount of recess from the faceplate would be, typically, 3.8–5.1 cm.

Each panel, 31, includes an array of apertures, e.g., 34, which in this example are key-hole shaped. Each aperture includes an optical connector, only one of which is shown as 35 in FIG. 1. Each connector, as described in more detail below, is adapted to receive a termination, e.g., 30, from a fiber in a corresponding circuit pack which is inserted into position in the shelf, 10. Thus, for example, when circuit pack, 20, is inserted into guideways, 15 and 17, and slid into position, electrical contact will be made at the far end by connector, 22, and optical connection will be made at a point recessed from the near end by the fiber terminations on the pack being inserted into the connectors mounted in panel, 31. (It will be noted that in this example, two apertures are provided for each circuit pack to include two fiber connectors, although only one fiber is illustrated.)

Figure 2:
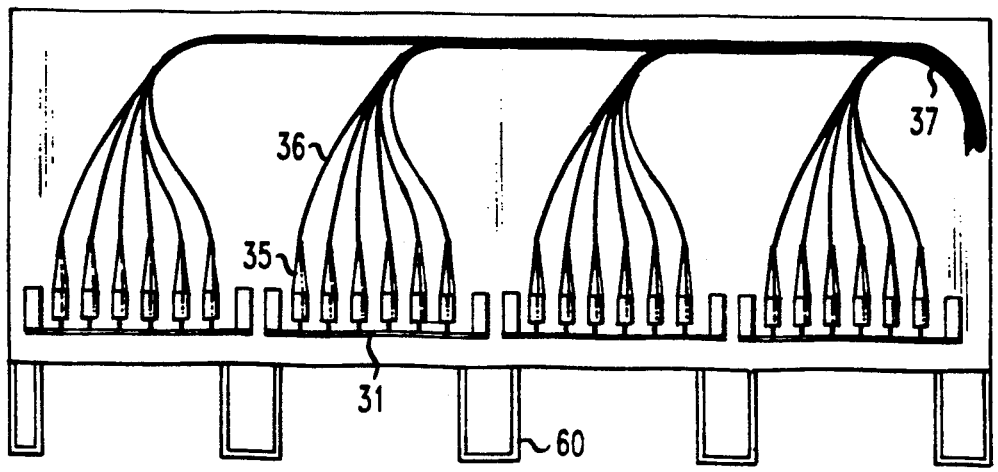
FIG. 2 is a top view of a fiber distribution apparatus in accordance with the same embodiment.

FIG. 2 illustrates, in a top view, the organization of the optical fibers which are coupled to the circuit packs (the circuit packs are not shown in this figure for the purpose of clarity). It will be noted that each optical connector, e.g., 35, mounted in the apertures of the panels, e.g., 31, has an optical fiber, e.g., 36, extending therefrom to the far end of the shelf. A set of such fibers from a panel can be grouped together and joined to sets of fibers from other panels to form a single cable, 37, of fibers which extend off the shelf for coupling to some outside equipment (not shown). It will be appreciated, therefore, that the fibers are neatly arranged in a horizontal plane above the top shelf (11 of FIG. 1) so that the fibers are out of sight from the near end. It will also appreciated, therefore, since the connectors, e.g., 35, are only slightly recessed from the near end, the connectors can be easily replaced or otherwise serviced from the near end.

It will also be noted that the top and bottom shelves also include extensions, e.g., 60, which can accommodate standard circuit packs without fiber connections (i.e., the shelves in these areas extend flush with the faceplates of the circuit packs).

Figure 3:
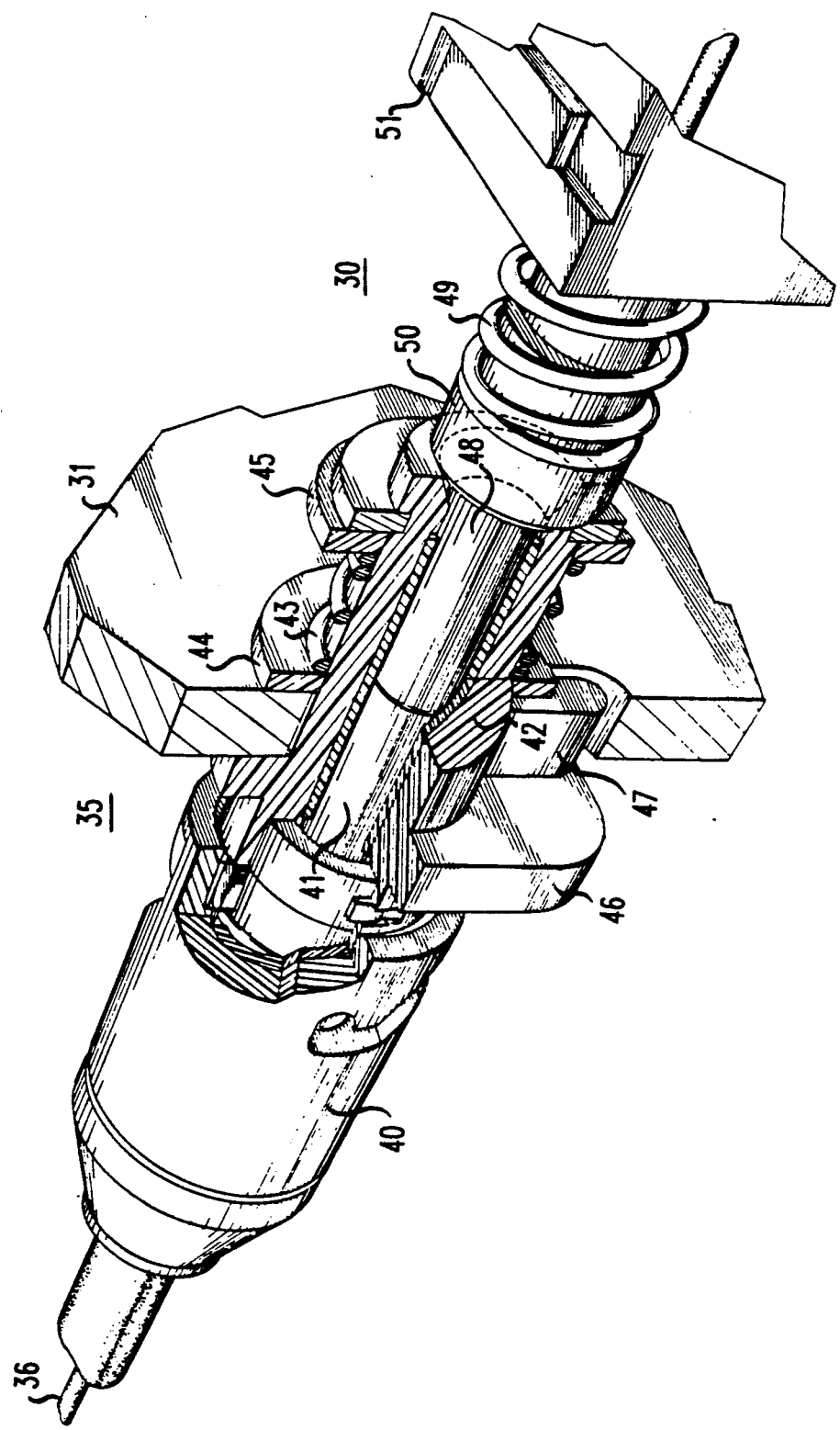
FIG. 3 is a perspective, partly cut-away view of a portion of the apparatus of FIGS. 1 and 2.

FIG. 3 illustrates in more detail a typical optical connector and termination combination which can be utilized in the invention. The connector, 35, mounted in the panel, 31, includes a standard ST ® connector, 40, with an optical fiber, 36, extending therefrom. (For an example of an ST ® connector, see U.S. Pat. No. 4,634,214 issued to Cannon, et al.) The connector includes a ferrule, 41, which extends into a sleeve, 42, mounted within the aperture of the panel 31. A spring, 43, is mounted around the outer end of the sleeve, 42, between two washers, 44 and 45. The spring causes a flange, 46, to be held against a surface of the panel, 31. A key, 47, is provided to prevent rotation of the sleeve in the aperture of the panel.

The termination, 30, includes a ferrule, 48, which is inserted into the sleeve, 42, for optically coupling with the ferrule, 41. A spring, 49, is positioned between a collar, 50, and a mounting member, 51, of the termination to provide axial tolerance. (For a more detailed discussion of the connector and terminator, see, for example, U.S. Pat. No. 4,881,792 issued to Alameel et al.)

Various modifications of the invention will become apparent to those skilled in the art. All such variations which basically rely on the teachings through which the invention has advanced the art are properly considered within the scope of the invention.

We claim:

1. An optical fiber distribution apparatus having a near end and a far end comprising:

a backplane located at the far end of the apparatus for providing electrical connection to a plurality of circuit packs when inserted in the apparatus;

a plurality of guideways provided at least at the near end of the apparatus to permit insertion of said circuit packs in the apparatus so that the circuit packs extend from the near end to the far end and electrical connection is provided to the circuit packs at the far end; and a panel including a plurality of optical connectors mounted at a position between the near end and far end to provide optical connection to circuit packs by axially receiving therein optical fiber terminations mounted to the circuit packs when the packs are inserted in the guideways.

2. Apparatus according to claim 1 further comprising a pair of shelves extending essentially perpendicular to the backplane, and wherein the guideways comprise grooves formed within facing surfaces of the shelves.

3. Apparatus according to claim 2 wherein the panel is mounted to one of the shelves on a surface opposite to the grooves.

4. Apparatus according to claim 3 wherein the panel comprises a board including a plurality of apertures in which the connectors are mounted, and the board is mounted to the shelf by means of brackets.

5. Apparatus according to claim 3 wherein each connector includes an optical fiber extending therefrom away from the near end, the fibers are positioned on the surface of the shelf to which the panel is mounted, and each connector provides axial alignment of its optical fiber with a fiber termination on a circuit pack when inserted in the guideway.

6. Apparatus according to claim 2 wherein the panel is recessed approximately 0.5–1.5 cm from the near end of the shelf.

7. Apparatus according to claim 1 further comprising a plurality of circuit packs with front and back ends, each pack including a circuit board with a fiber organizer comprising a tab portion including an optical fiber termination thereon near the front end and extending above the circuit board such that the fiber termination is received axially by an associated connector.

* * * * *